United States Patent [19]

Bossier

[11] Patent Number: 5,656,175
[45] Date of Patent: Aug. 12, 1997

[54] RECOVERY OF METAL OXIDES FROM A SLURRY

[75] Inventor: Jody Elbert Bossier, Greensburg, La.

[73] Assignee: Cytec Technology Corp., Wilmington, Del.

[21] Appl. No.: 498,313

[22] Filed: Jul. 5, 1995

[51] Int. Cl.$^6$ .................................................. C02F 1/56
[52] U.S. Cl. .............................. 210/727; 209/5; 210/734; 423/85; 423/610
[58] Field of Search .............................. 209/5; 210/725, 210/727, 728, 734; 423/85, 610

[56] References Cited

U.S. PATENT DOCUMENTS

| | | | |
|---|---|---|---|
| 3,658,474 | 4/1972 | Rothwell | 210/734 |
| 3,859,212 | 1/1975 | Smalley et al. | 210/734 |
| 4,093,542 | 6/1978 | Dahmen et al. | 210/734 |
| 4,241,042 | 12/1980 | Matijevic et al. | 423/610 |
| 4,569,768 | 2/1986 | McKinley | 210/727 |
| 4,574,078 | 3/1986 | Cortesi et al. | 423/592 |
| 4,767,540 | 8/1988 | Spitzer et al. | 210/728 |
| 4,803,064 | 2/1989 | Montino et al. | 423/612 |
| 5,055,200 | 10/1991 | Miki et al. | 210/726 |
| 5,112,500 | 5/1992 | Jones | 210/728 |
| 5,158,688 | 10/1992 | Craven et al. | 210/734 |
| 5,282,977 | 2/1994 | Schinkitz | 210/724 |
| 5,368,745 | 11/1994 | Rothenberg et al. | 210/734 |

FOREIGN PATENT DOCUMENTS 0055489  7/1982  European Pat. Off. ............. 210/727

*Primary Examiner*—Peter A. Hruskoci
*Attorney, Agent, or Firm*—Claire M. Schultz

[57] ABSTRACT

A process for recovering metal oxides from waste water using anionic and cationic polymeric emulsions is disclosed. The treated metal oxides may then be recovered using a clarification step. Steps requiring the adjustment of pH based on the use of acids and base are thereby eliminated.

10 Claims, No Drawings

RECOVERY OF METAL OXIDES FROM A SLURRY

TECHNICAL FIELD

This invention relates to the recovery of metal oxides. More specifically, this invention relates to a novel process for the recovery of metal oxides such as titanium dioxide from a slurry by the use of an anionic and a cationic polymer prior to passage of the slurry into waste water or wash water stream.

BACKGROUND OF THE INVENTION

Titanium dioxide ($TiO_2$) is a white powder found in two crystalline forms, anatase and rutile. It has a wide variety of uses including opacifying agents; paint pigments; as an additive to paper, rubber, plastics, cosmetics, floor coverings, glassware and ceramics, printing inks, welding rods and the like. Specifically, $TiO_2$ may be used as a component in plastics, paper and paperboard, and coatings that may come in contact with food. The amount of $TiO_2$ that is considered safe is determined by the FDA as an amount up to a maximum of about 20% of the material to which it is added.

Generally, $TiO_2$ is derived from ilmenite or rutile. For example, one method is to treat ilmenite with sulfuric acid to produce $TiO_2$ in anatase form. Another method is to chlorinate rutile followed by the conversion of titanium tetrachloride to the rutile form by oxidation. These methods for making $TiO_2$ require the use of harsh chemicals and conditions, notably by the use of acids and bases.

Various other methods for preparing titanium dioxide are known in the art. For example, in U.S. Pat. No. 4,241,042, there is disclosed a method for preparing $TiO_2$ which comprises preparing a liquid aerosol of a hydrolyzable Ti(IV) compound, and then reacting the resulting aerosol with water vapor in order to obtain hydrated dioxide which, after drying at a temperature of 120° to 130° C., is converted to crystalline phase anatase. If the reaction is conducted at higher temperatures, of the order of 1100° C., it is converted to rutile.

An alternate method in the '042 patent is to avoid the mixing step of the invention of the '042 patent. This alternate method is described in U.S. Pat. No. 4,574,078.

$TiO_2$ may also be prepared by using homogeneous precipitation, as described in "Preparation and Mechanism of Formation of Titanium Dioxide Hydrosols of Narrow Size Distribution", E. Matijevic, M. Budnik and L. Meites in "Journal of Colloid and Interface Science" Vol. 61, (2), 1977. This process involves hydrolysis of $TiCl_4$ solution at about 100° C. in the presence of sulfate ions. The $TiCl_4$ is acidic due to the hydrochloric acid.

$TiO_2$ is prepared in the form of spherical particles. See U.S. Pat. No. 4,803,064. The '064 patent relates to treating Ti(IV) with strong acid in the presence of cationic polyelectrolytes having a high molecular weight.

In the art, the recovery of $TiO_2$ from solution also requires harsh reactive conditions, as adjustment of the solution using strong acidic and alkaline solutions is typically needed. For example, U.S. Pat. No. 5,282,977 teaches a method for separation of heavy metals from waste water by lowering the initial phase to a pH of about 3 using dolomite brick powder. The '977 patent teaches the use of calcium hydroxide and/or sodium hydroxide to raise the pH.

Various other processes for recovering metal oxides also require a pH adjustment using harsh reaction conditions. For example, DE 27 29 756 A uses sulfuric acid to precipitate the metal salt prior to recovering it. U.S. Pat. No. 3,016,286 teaches a two-stage recovery process in which ammonia is used to precipitate the metal ions. These patents are incorporated herein by reference.

Conventionally, a preferred method for recovering $TiO_2$ is to adjust the slurry solution with a strong acid or base. Generally, hydrochloric acid and sodium hydroxide are used. One reason why the pH must be adjusted is to accommodate the use of aluminum sulfate. This step is highly undesirable due to the harsh reactive conditions, but necessary in the prior art procedures.

Subsequently, the aqueous slurry that has been treated with acid and/or base is then treated with aluminum sulfate and a polymer, preferably an anionic polymer as a flocculant to clarify the solution prior to processing in the waste treatment area. The entire process may be repeated to achieve maximum purification and to maximize the recovery of the heavy metal.

Separation of suspended solids from aqueous suspension has been known in the art. U.S. Pat. No. 5,112,500 teaches the use of incompatible, counterionic organic flocculants. Treatment of low concentration turbid water by forcible sequential additions of anionic and cationic coagulants has been taught in U.S. Pat. No. 5,055,200. However, there has been no teaching or suggestion in the art for recovery of metal oxides without use of the harsh reactive conditions resulting from the addition of strong acids and/or bases.

There is thus a need in the industry for a process of recovering metal oxides, especially titanium oxides, from slurry that does not require the use of harsh chemical treatment, for example, by a process that does not require the use of strong acids and strong bases.

The present invention describes a process for the recovery of metal oxides that uses highly charged polymeric emulsions. Unexpectedly, the novel process of this invention does not require pH adjustments which create harsh conditions. In addition to the advantage of not having to control the pH, which is a safety benefit and a cost saving benefit provided by this invention, the present process also performs better than the conventional recovery processes.

SUMMARY OF THE INVENTION

This invention is directed to the recovery of metal oxides from a slurry.

The process for the recovery of metal oxides from solution in this invention comprises sequentially contacting the solution, for example, a slurry solution, with a negatively charged and a positively charged product. The negatively charged product is preferably an anionic polymer, more preferably, a hydroxamated polyacrylamide. The positively charged product is preferably a cationic polymer, more preferably a cationic quaternary Mannich acrylamide.

After the stream containing metal oxides has been treated with the anionic and cationic polymer, the resulting material is settled in a clarifier, such as a gravity settler, with minimal agitation, and the solid metal oxides are separated and recovered.

DETAILED DESCRIPTION OF THE PREFERRED EMBODIMENTS

Surprisingly, a novel method has now been found for recovering metal oxides from a stream. Specifically, titanium dioxide is recovered from slurry, i.e., waste water, so as to enable the water to be recycled or discarded without detriment to the environment.

The processing of, for example, TiO$_2$ is usually done as a slurry. In another words, the metal is in the water as discrete metal particles. The slurry is pumped into various plate and frame presses for water removal, followed by a clarification step using settling apparatus, e.g., lamelias. At this point, the solution may contain a significant amount of suspended TiO$_2$ in the water.

The present invention significantly improves the recovery of metal oxides from the slurry prior to water purification. It is especially suitable for treatment of large quantities of waste water obtained in the recovery of TiO$_2$ and requiring a high degree of end purity.

The benefit of this invention is the improved process for recovering the metal oxides in the slurry without the necessity of adjusting the pH with strong acids and bases. Instead, only highly charged cationic and anionic polymers are used. Preferably, the anionic polymer is added before the cationic polymer in the process of this invention.

While not wishing to be bound by any particular theory, it is possible that the instant process for recovering metal oxides is performed in two steps. The colloidal state of the solution is first brought into suspension by the first ionic polymer as a coagulation step. The so-treated slurry solution is then flocculated by the use of the second ionic polymer. It is possible that coagulation and flocculation steps in this invention may occur substantially at the same time when the anionic and cationic polymers are added together.

Any cationic polymer with high total charge may be used. As provided herein, high total charge refers to a polymer having a high ionicity. It is preferred that the cationic polymers possess greater than about a 60% total charge. For the purpose of this invention, the percent total charge is defined as the mole percent of the unit of the polymer which are charged. Preferably, the total charge of the cationic polymer is greater than about 80%. More preferably, the total charge of the cationic polymer is greater than about 90%.

Acrylamide polymers which are functionalized with cationic groups such as a polymer or copolymer of acrylamide with one or more of the cationic monomers may be used. Preferably, these may include, though not limited to, cationically active polyacrylamides. More preferably, the cationic products are chosen from quaternized Mannich polyacrylamides. The concentration of the cationic polymer used in the recovery process should range from about 1 to 10 parts per million (ppm) pounds of the total reactive slurry. Preferably, the concentration of the cationic polymer used in this invention ranges from 1 to 5 ppm.

Preferably, the cationic compositions used in the process of this invention comprise (alk)acrylamide-containing polymeric microparticles, the (alk)acrylamide polymer being substituted with at least about 1 mole percent of quaternized tertiary aminomethyl groups and having an average particle size of from about 200 to about 4000 Å in diameter which are generally prepared by an inverse microemulsion polymerization process.

The backbone of the Mannich acrylamide polymers useful in the present invention may comprise units of such (alk) acrylamides as acrylamide, methacrylamide, ethacrylamide and the like.

The backbones of the Mannich acrylamide polymers useful in the present invention may also comprise an (alk) acrylamide copolymerized with a cationic, water-soluble, ethylenically unsaturated comonomer in amounts up to about 90% by weight. Water-soluble, anionic comonomers may also be used in substantially lower amounts, i.e., such that the cationicity of the resulting polymer falls within the above-described limits.

Useful cationic monomers include diallyl dialkylammonium chlorides, N,N-dialkylaminoalkyl(meth)acrylates, N,N-dialkylaminoalkyl(meth)acrylamides and salts, quaternaries and mixtures thereof.

Water-soluble, non-ionic monomers, which may be present in small amounts in the cationic polymers used in the practice of this invention, generally comprise N-vinyl pyrrolidone, N,N-dialkylmethacrylamides, hydroxyalkyl methacrylates, N-vinylformamide and the like. Small quantities, i.e., up to about 10% by weight of other copolymerizable monomers, such as methyl acrylate, methyl methacrylate, acrylonitrile, vinyl acetate, styrene, etc. may also be used.

The microemulsion compositions used in the process of the present invention may be prepared using known inverse microemulsion polymerization techniques. P. Speiser reported in 1976 and 1977 a process for making spherical "nanoparticles" with diameters less than 800 Å by (1) solubilizing monomers, such as acrylamide and methylenebisacrylamide and other materials, such as drugs in micelles and (2) polymerizing the monomers, see J. Pharm. Sa., 65 (12), 1763 (1976) and U.S. Pat. No. 4,021,364. Both water-in-oil and oil-in-water systems can be used to prepare these nanoparticles. While not specifically called microemulsion polymerization by the author, this prior art process does contain all the features which are currently used to define microemulsion polymerization. These reports also constitute the first examples of polymerization of acrylamide in a microemulsion. Since then, the numerous publications reporting polymerization of water-soluble polymers in the inverse phase of microemulsions have appeared, see, for example, U.S. Pat. Nos. 4,521,317 and 4,681,912 and GB No. 2162492 A., incorporated herein by reference.

Further descriptions on the cationic polymers which may be used in this invention may be found in U.S. Pat. Nos. 4,956,399, 4,968,435, 5,274,055, 5,340,865, 5,354,481 and 5,405,554, incorporated herein by reference.

The anionic polymers may be chosen from any anionic polymer with a high total charge. As with the cationic polymers, this invention requires the use of any anionic polymer of greater than about 60% total charge. Preferably, the total charge of the anionic polymer is greater than about 80%. More preferably, the total charge of the anionic polymer is greater than about 90%. Preferably, useful polymers may include, though not be limited to, anionic polyacrylamides. More preferably, the anionic products are chosen from hydroxamated polyacrylamides. The concentration of the anionic polymer used in the recovery process should range from about 1 to 10 ppm. Preferably, the concentration of the anionic polymer used in this invention ranges from about 1 to 5 ppm.

Anionic monomers useful in producing anionic polymers useful in the practice of this invention may comprise acrylic or methacrylic acid, fumaric acid, crotonic acid, maleic acid, salts of these acids, 2-acrylamido-2-methylpropane sulfonic acid, styrene sulfonic acid and their salts and the like. Hydroxamated anionic polymers are preferred in this invention. Any anionic water soluble hydroxamic acid or salt group-containing polymer may be used. These polymers are well known in the art and can be derived from polymers containing pendent ester, amide, anhydride, nitrile, etc., groups by the reaction thereof with hydroxylamine or its salt.

Exemplary of the polymers which may be hydroxamated for use in the process of this invention are acrylic, methacrylic, crotonic, etc., acid ester polymers such as polymers produced from the polymerization of methyl acrylate, ethyl acrylate, t-butyl acrylate, methyl methacrylate, ethyl methacrylate, cyclohexyl methacrylate, dimethyl aminoethyl methacrylate, dimethyl aminoethyl acrylate, methyl crotonate, etc., polymers of maleic anhydride and esters thereof, and the like, nitrile polymers such as those produced from acrylonitrile etc., amide polymers such as those produced from acrylamide, methacrylamide and the like.

Hydroxamated polymers are well known to those skilled in the art and are specifically disclosed, as are methods for their production, in U.K. Pat. Appln. 21771127 and U.S. Pat. Nos. 3,345,344, 4,480,067, 4,532,046, 4,536,296 and 4,587,306, hereby incorporated herein by reference.

Also, it has been found that inverse emulsions made of, for example, aqueous polyacrylamide or acrylamide/acrylic acid copolymers dispersed in oil can be reacted directly with hydroxylamine or its salt to give very high molecular weight polymers containing hydroxamic acid groups, all of which function efficiently in the process of the present invention.

Any type of mechanical clarifier is contemplated in this invention. Lamellas which operate with a minimal amount of agitation are preferred.

The present invention, together with additional features contributing thereto and advantages accruing therefrom, will be apparent from the following examples of the invention which are set forth for purposes of illustration only and are not to be construed as limitations on the present invention except as set forth in the appended claims.

EXAMPLES 1 to 7

Varying concentrations of anionic and cationic polymers are used to evaluate their effectiveness in flocculating $TiO_2$ from a slurry. The anionic polymeric emulsion used is an anionic hydroxamated polyacrylamide. The cationic polymeric emulsion used is a quaternized Mannich polyacrylamide, both commercially available from Cytec Industries Inc., West Paterson, N.J.

Various grades of $TiO_2$ are used. Grade A $TiO_2$ is used in the form of a slurry containing 337 gram $TiO_2$ per liter of slurry. Grade B $TiO_2$ is used in the form of a slurry containing 328 gram $TiO_2$ per liter of slurry. Each of these slurry mixtures is diluted with 250 mL of water. The two slurry mixtures consisting of grades A and B $TiO_2$ are combined, resulting in 500 ml of a slurry mixture containing 1 gram per liter $TiO_2$. A stirring rod is used to ensure uniform flow of the particles in the slurry. 0.1% of an hydroxamated polyacrylamide (HPAM) is added using a 10 mL lab syringe. After mixing, 0.1% the Mannich polyacrylamide is added using a 10 mL syringe. The slurry is then mixed and allowed to settle for 30 seconds. A 100 mL aliquot is then analyzed to determine the total suspended solid. HPAM has about 80% total charge and the quaternized Mannich polyacrylamide has about 80% total charge.

It is shown from Table I that the sequential addition of anionic polymeric emulsions followed by an equal or slightly greater amount of cationic polymeric emulsions into the Grades A and B $TiO_2$ mixture produces a result in a mixture of less than or equal to the desired 0.05 gram per liter Grades A and B $TiO_2$ mixture.

TABLE I

| Example | HPAM - anionic polymer (ppm) | Mannich Polyacrylamide - cationic polymer (ppm) | resulting solution (g/l) |
| --- | --- | --- | --- |
| 1 | 10 | 20 | 0.05 |
| 2 | 20 | 10 | 0.10 |
| 3 | 20 | 20 | 0.01 |
| 4 | 15 | 15 | 0.01 |
| 5 | 15 | 20 | 0.03 |
| 6 | 10 | 10 | 0.01 |
| 7 | 5 | 5 | <0.01 |

EXAMPLES 8 to 15

Trials using Grade A $TiO_2$ are conducted. Each sample contains 1.3 mL of an initial concentration of 373 grams per liter of Grade A $TiO_2$. In Examples 8 to 13, the anionic hydroxamated polymeric emulsion and the cationic heat-treated, quaternized Mannich polyacrylamide are the same as those polymers trialed in Examples 1 to 7. In Examples 12 and 13, the sequence of anionic hydroxamated polymeric emulsion and quaternized heat-treated, Mannich polyacrylamide used are reversed. In Examples 14 and 15, only the anionic hydroxamated polymeric emulsion polymer is used. In Examples 16 to 18, the anionic polymer is an acrylamide/acrylate polymer of 30% total charge and the cationic polymer is an acrylamide/methyl chloride quaternary salt of N,N-dimethylaminoethylacrylate polymer of 55% total charge. The dosage for each of the ionic polymers used was 5, 10 and 20 ppm.

It is shown in Table II that when using only one polymer, i.e., the highly charged anionic polymer (Examples 14 and 15), good flocculation is not provided. It is also shown that when using excess concentration of polymers with a lower total charge for the polymers, the metal oxide does not undergo good flocculation, resulting in a slimy and gel-like solution. Further, using a different set of anionic and cationic polymers having a lower percentage of total charge also does not provide as good a flocculation as the set of polymers having higher percentage of total charge (Examples 8 to 13).

TABLE II

| Example | anionic polymer (ppm) | cationic polymer (ppm) | resulting solution (g/l) |
| --- | --- | --- | --- |
| 8 | 10 | 10 | 0.02 |
| 9 | 5 | 5 | 0.04 |
| 10 | 3 | 3 | 0.04 |
| 11 | 1 | 1 | 0.06 |
| 12 | 10 | 10 | 0.01 |
| 13 | 5 | 5 | 0.07 |
| 14C | — | 5 | clumping |
| 15C | — | 10 | clumping |
| 16C | 10 | 10 | 0.08 |
| 17C | 20 | 20 | overdose |
| 18C | 5 | 5 | 0.05 |

C = comparative

EXAMPLES 19 to 30

Trials using Grade A $TiO_2$ are conducted. Each sample contains 1.3 mL of an initial concentration of 373 gram per liter of Grade A $TiO_2$. For Examples 19 to 30, the polymers contain different total charges. For Examples 19 to 24, the cationic polymer is an acrylamide/diallyldimethylammonium chloride polymer, with a total charge of 90% and the anionic polymer is acrylamide/acrylate polymer, with a total charge of 60%. In Examples 19 to 21, the anionic polymer is added before the cationic polymer. In Examples 22 to 24, the cationic polymer is added before the anionic polymer.

In examples 25 to 30, the cationic polymer is an acrylamide/methyl chloride quaternary salt of N,N-dimethylaminoacrylate polymer, with a total charge of 60% and the anionic polymer is an acrylate polymer, with a total charge of 90%. In examples 25 to 27, the anionic polymer is added before the cationic polymer. In examples 28 to 30, the cationic polymer is added before the anionic polymer.

It is shown in Table III that when using a cationic and anionic polymer in which one polymer is of a low total charge and the other polymer is of a high total charge, flocculation is possible, but the flocculation is not effective when both the cationic and anionic polymers have a high total charge.

TABLE III

| Example | anionic polymer (ppm) | cationic polymer (ppm) | resulting solution (g/l) |
|---------|----------------------|------------------------|--------------------------|
| 19 | 3 | 3 | 0.10 |
| 20 | 5 | 5 | 0.07 |
| 21 | 10 | 10 | 0.11 |
| 22 | 3 | 3 | 0.10 |
| 23 | 5 | 5 | 0.09 |
| 24 | 10 | 10 | 0.12 |
| 25 | 3 | 3 | 0.11 |
| 26 | 5 | 5 | 0.07 |
| 27 | 10 | 10 | 0.13 |
| 28 | 3 | 3 | 0.11 |
| 29 | 5 | 5 | 0.08 |
| 30 | 10 | 10 | 0.12 |

EXAMPLES 31 to 33

A trial using a different metal oxide is conducted. Each of Examples 31 to 33 contains a slurry mixture which comprise 1.5 mL of an initial concentration of 323 gram per liter of $CrO_3$. The anionic polymer is a 0.1% hydroxamated polyacrylamide added using a 10 mL lab syringe. The slurry is then mixed and allowed to settle for 30 seconds. A 100 mL aliquot is then analyzed to determine the total suspended solid.

It can be shown from Table IV that treatment using high total charged cationic and anionic polymers to flocculate is effective in reducing the amount of $CrO_3$ in the slurry mixture.

TABLE IV

| Example | anionic polymer (ppm) | cationic polymer (ppm) | resulting solution (g/l) |
|---------|----------------------|------------------------|--------------------------|
| 31 | 3 | 3 | 0.18 |
| 32 | 5 | 5 | 0.12 |
| 33 | 10 | 10 | 0.27 |

It will be appreciated that variations and modifications to the products and methods can be made by the skilled person without departing from the spirit or scope of the invention as defined in the appended claims.

What is claimed is:

1. A process for flocculating metal oxides including titanium dioxide from a slurry, which comprises contacting said slurry containing said metal oxides with an effective amount of an anionic hydroxamated acrylamide polymer of at least 60% anionic charge and a cationic acrylamide polymer of at least 60% cationic charge.

2. The process of claim 1 wherein said anionic polymer is present in between 3 to 7 parts of anionic polymer per million parts of said metal oxides.

3. The process of claim 1 wherein said cationic polymer is a quaternary Mannich acrylamide polymer.

4. The process of claim 1 wherein said cationic polymer is present in between 3 to 7 parts of cationic polymer per million parts of said metal oxides.

5. A process for flocculating metal oxides including titanium dioxide from a slurry, which process comprises sequentially contacting said slurry containing said oxides with an effective amount of an anionic hydroxamated acrylamide polymer of at least 60% anionic charge and cationic acrylamide polymer of at least 60% cationic charge.

6. The process of claim 5 wherein said anionic polymer is present in between 3 to 7 parts anionic polymer per million parts of metal oxides.

7. The process of claim 5 wherein said cationic polymer is present in between 3 to 7 parts cationic polymer per million parts of metal oxides.

8. The process of claim 5 wherein said cationic polymer is a quaternary mannich acrylamide polymer.

9. A process of flocculating titanium oxides from a slurry, which comprises sequentially contacting said slurry containing said titanium oxides with about 5 parts of hydroxamated polyacrylamide of at least 60% anionic charge followed by about 5 parts of quaternary Mannich acrylamide of at least 60% cationic charge, per million parts of titanium oxides.

10. A process of claim 9 which further comprises removing said titanium oxides with a gravity settler.

* * * * *

UNITED STATES PATENT AND TRADEMARK OFFICE
CERTIFICATE OF CORRECTION

PATENT NO. : 5,656,175
DATED : August 12, 1997
INVENTOR(S) : Jody Elbert Bossier It is certified that error appears in the above-indentified patent and that said Letters Patent is hereby corrected as shown below:

```
Column 8, line 44, change "oxides" to -- dioxide --.
Column 8, line 46, change "oxides" to -- dioxide --.
Column 8, line 49, change "oxides" to -- dioxide --.
Column 8, line 51, change "oxides" to -- dioxide --.
```

Signed and Sealed this

Twenty-fifth Day of November, 1997

Attest:

BRUCE LEHMAN

Attesting Officer     Commissioner of Patents and Trademarks